United States Patent
Kapinos et al.

(10) Patent No.: US 11,561,692 B2
(45) Date of Patent: Jan. 24, 2023

(54) DYNAMIC INPUT CONTROL POSITIONING

(71) Applicant: LENOVO (Singapore) PTE. LTD., New Tech Park (SG)

(72) Inventors: Robert James Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 292 days.

(21) Appl. No.: 16/012,671

(22) Filed: Jun. 19, 2018

(65) Prior Publication Data

US 2019/0384488 A1    Dec. 19, 2019

(51) Int. Cl.
| | |
|---|---|
| *G06F 3/00* | (2006.01) |
| *G06F 3/04883* | (2022.01) |
| *G06F 3/04842* | (2022.01) |
| *G06F 3/16* | (2006.01) |
| *G06F 3/01* | (2006.01) |

(52) U.S. Cl.
CPC .......... *G06F 3/04883* (2013.01); *G06F 3/016* (2013.01); *G06F 3/04842* (2013.01); *G06F 3/167* (2013.01)

(58) Field of Classification Search
CPC .. G06F 3/04883; G06F 3/016; G06F 3/04842; G06F 3/167
See application file for complete search history.

(56) References Cited

U.S. PATENT DOCUMENTS

| | | | | |
|---|---|---|---|---|
| 5,500,936 A | * | 3/1996 | Allen | G06F 3/0482 715/732 |
| 6,005,931 A | * | 12/1999 | Neyman | H04M 3/5191 379/207.02 |
| 8,274,484 B2 | * | 9/2012 | Baudisch | G06F 3/04883 345/173 |
| 9,244,530 B1 | * | 1/2016 | Raman | G06F 3/016 |
| 9,921,714 B1 | * | 3/2018 | Shapiro | G06F 3/04817 |
| 2001/0042791 A1 | * | 11/2001 | Postlewaite | G06K 7/10881 235/462.25 |
| 2007/0035524 A1 | * | 2/2007 | Hyatt | G06F 1/1626 345/173 |
| 2008/0077874 A1 | * | 3/2008 | Garbow | G06F 3/0486 715/764 |
| 2008/0252527 A1 | * | 10/2008 | Garcia | G01S 1/68 342/450 |

(Continued)

*Primary Examiner* — Cesar B Paula
*Assistant Examiner* — David Faber
(74) *Attorney, Agent, or Firm* — Kunzler Bean & Adamson (57) ABSTRACT

Apparatuses, methods, systems, and program products are disclosed for sharing content with a detected device. An apparatus includes a touch-sensitive display, a processor, and a memory that stores code executable by the processor. The memory stores code executable by the processor to determine an application requesting touch input from a user. The memory stores code executable by the processor to detect one or more contact locations of a touch input on the touch-sensitive display. The memory stores code executable by the processor to position, dynamically, one or more interface controls for providing touch input to the application at the one or more contact locations detected on the touch-sensitive display.

18 Claims, 5 Drawing Sheets

(56) References Cited

U.S. PATENT DOCUMENTS

| | | | |
|---|---|---|---|
| 2009/0167704 A1* | 7/2009 | Terlizzi | G09B 23/28 345/173 |
| 2010/0156808 A1* | 6/2010 | Stallings | G06F 3/04886 345/173 |
| 2011/0169868 A1* | 7/2011 | Amemiya | G06F 3/04817 345/676 |
| 2011/0248839 A1* | 10/2011 | Kwok | G06F 3/016 340/407.2 |
| 2014/0009421 A1* | 1/2014 | Lee | G06F 3/041 345/173 |
| 2014/0035826 A1* | 2/2014 | Frazier | G06F 3/04886 345/173 |
| 2014/0049483 A1* | 2/2014 | Kim | G06F 3/0488 345/173 |
| 2014/0152583 A1* | 6/2014 | Bastide | G06F 3/0488 345/173 |
| 2016/0065838 A1* | 3/2016 | Chen | G06F 3/0487 348/333.02 |
| 2016/0149988 A1* | 5/2016 | Pang | G06F 40/14 715/234 |
| 2016/0248906 A1* | 8/2016 | Schrader | H04W 12/08 |
| 2019/0121470 A1* | 4/2019 | Roziere | G06F 3/04883 |
| 2019/0135199 A1* | 5/2019 | Galan Garcia | B60K 35/00 |

\* cited by examiner

DYNAMIC INPUT CONTROL POSITIONING

FIELD

The subject matter disclosed herein relates to providing input on a device, and more particularly relates to dynamically presenting input controls on a touch-screen display of a device so that the device can be used without looking at the display.

BACKGROUND

Looking at displays of mobile devices can be distracting, and at times dangerous, while performing activities that require the user's full attention such as driving. Some applications may only require a quick user response provided by touch input on a touch-sensitive display; however, in order to provide such a response, the user is typically required to look at the display to locate the input controls on the display, which draws attention from other activities the user is performing.

BRIEF SUMMARY

An apparatus for dynamic input control positioning is disclosed. The apparatus, in one embodiment, includes a touch-sensitive display, a processor, and a memory that stores code executable by the processor. In one embodiment, the memory stores code executable by the processor to determine an application requesting touch input from a user. In a further embodiment, the memory stores code executable by the processor to detect one or more contact locations of a touch input on the touch-sensitive display. In certain embodiments, the memory stores code executable by the processor to position, dynamically, one or more interface controls for providing touch input to the application at the one or more contact locations detected on the touch-sensitive display.

A method for dynamic input control positioning includes, in one embodiment, determining, by a processor, an application requesting touch input from a user. The method, in some embodiments, includes detecting one or more contact locations of a touch input on a touch-sensitive display. The method, in various embodiments, includes positioning, dynamically, one or more interface controls for providing touch input to the application at the one or more contact locations detected on the touch-sensitive display.

A program product for dynamic input control positioning, in one embodiment, includes a computer readable storage medium that stores code executable by a processor. In some embodiments, the executable code includes code to perform determining an application requesting touch input from a user. The executable code, in certain embodiments, includes code to perform detecting one or more contact locations of a touch input on a touch-sensitive display. The executable code, in certain embodiments, includes code to perform positioning, dynamically, one or more interface controls for providing touch input to the application at the one or more contact locations detected on the touch-sensitive display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for dynamic input control positioning is disclosed. The apparatus, in one embodiment, includes a touch-sensitive display, a processor, and a memory that stores code executable by the processor. In one embodiment, the memory stores code executable by the processor to determine an application requesting touch input from a user. In a further embodiment, the memory stores code executable by the processor to detect one or more contact locations of a touch input on the touch-sensitive display. In certain embodiments, the memory stores code executable by the processor to position, dynamically, one or more interface controls for providing touch input to the application at the one or more contact locations detected on the touch-sensitive display.

In one embodiment, the code is further executable by the processor to provide feedback in response to the one or more interface controls being positioned at the one or more contact locations. In certain embodiments, the feedback comprises haptic feedback selected from the group consisting of forces, vibrations, and motions. In further embodiments, the feedback comprises audio feedback provided through a speaker.

In one embodiment, the code is further executable by the processor to maintain the touch-sensitive display in an input only mode such that the touch-sensitive display receives touch input without presenting graphical elements on the display. In some embodiments, the code is further executable by the processor to determine the user's context in response to the application requesting touch input from the user. The user's context may indicate whether the user is in an uninterruptible state. The one or more interface controls may be dynamically positioned in response to the user being in the uninterruptible state. In certain embodiments, the user's context is determined using one or more sensors operably coupled to the processor that sense data describing the user's context.

In one embodiment, the code is further executable by the processor to detect a first pressure of the touch input on the touch-sensitive display. The first pressure may trigger positioning of the one or more interface controls on the touch-sensitive display. In certain embodiments, the code is further executable by the processor to detect a second pressure of the touch input. The second pressure may be greater than the first pressure. The second pressure may indicate a selection of at least one of the one or more interface controls.

In one embodiment, the code is further executable by the processor to receive user input in response to the user interacting with at least one of the one or more interface controls. In certain embodiments, the user input is selected from the group consisting of a swipe gesture, a tap gesture, and a force gesture in response to the one or more interface controls dynamically positioned at the one or more contact locations.

In further embodiments, the one or more interface controls comprise interface controls that are selectable by performing a single touch input on the touch-sensitive display. In one embodiment, the executable code is further executable by the processor to determine an orientation of the touch-sensitive display and orient the one or more interface controls to correspond to the orientation of the touch-sensitive display.

A method for dynamic input control positioning includes, in one embodiment, determining, by a processor, an application requesting touch input from a user. The method, in some embodiments, includes detecting one or more contact locations of a touch input on a touch-sensitive display. The method, in various embodiments, includes positioning, dynamically, one or more interface controls for providing touch input to the application at the one or more contact locations detected on the touch-sensitive display.

In one embodiment, the method includes providing feedback in response to the one or more interface controls being positioned at the one or more contact locations. The feedback may be selected from the group consisting of haptic feedback and audio feedback. In various embodiments, the method includes maintaining the touch-sensitive display in an input only mode such that the touch-sensitive display receives touch input without presenting graphical elements on the display.

In certain embodiments, the method includes determining the user's context in response to the application requesting touch input from the user. The user's context may indicate whether the user is in an uninterruptible state. The one or more interface controls may be dynamically positioned in response to the user being in the uninterruptible state.

In some embodiments, the method includes detecting a first pressure of the touch input on the touch-sensitive display. The first pressure may trigger positioning of the one or more interface controls on the touch-sensitive display. In further embodiments, the method includes detecting a second pressure of the touch input. The second pressure may be greater than the first pressure. The second pressure may indicate a selection of at least one of the one or more interface controls. In certain embodiments, the method includes determining an orientation of the touch-sensitive display and orienting the one or more interface controls to correspond to the orientation of the touch-sensitive display.

A program product for dynamic input control positioning, in one embodiment, includes a computer readable storage medium that stores code executable by a processor. In some embodiments, the executable code includes code to perform determining an application requesting touch input from a user. The executable code, in certain embodiments, includes code to perform detecting one or more contact locations of a touch input on a touch-sensitive display. The executable code, in certain embodiments, includes code to perform positioning, dynamically, one or more interface controls for providing touch input to the application at the one or more contact locations detected on the touch-sensitive display.

Figure 1:
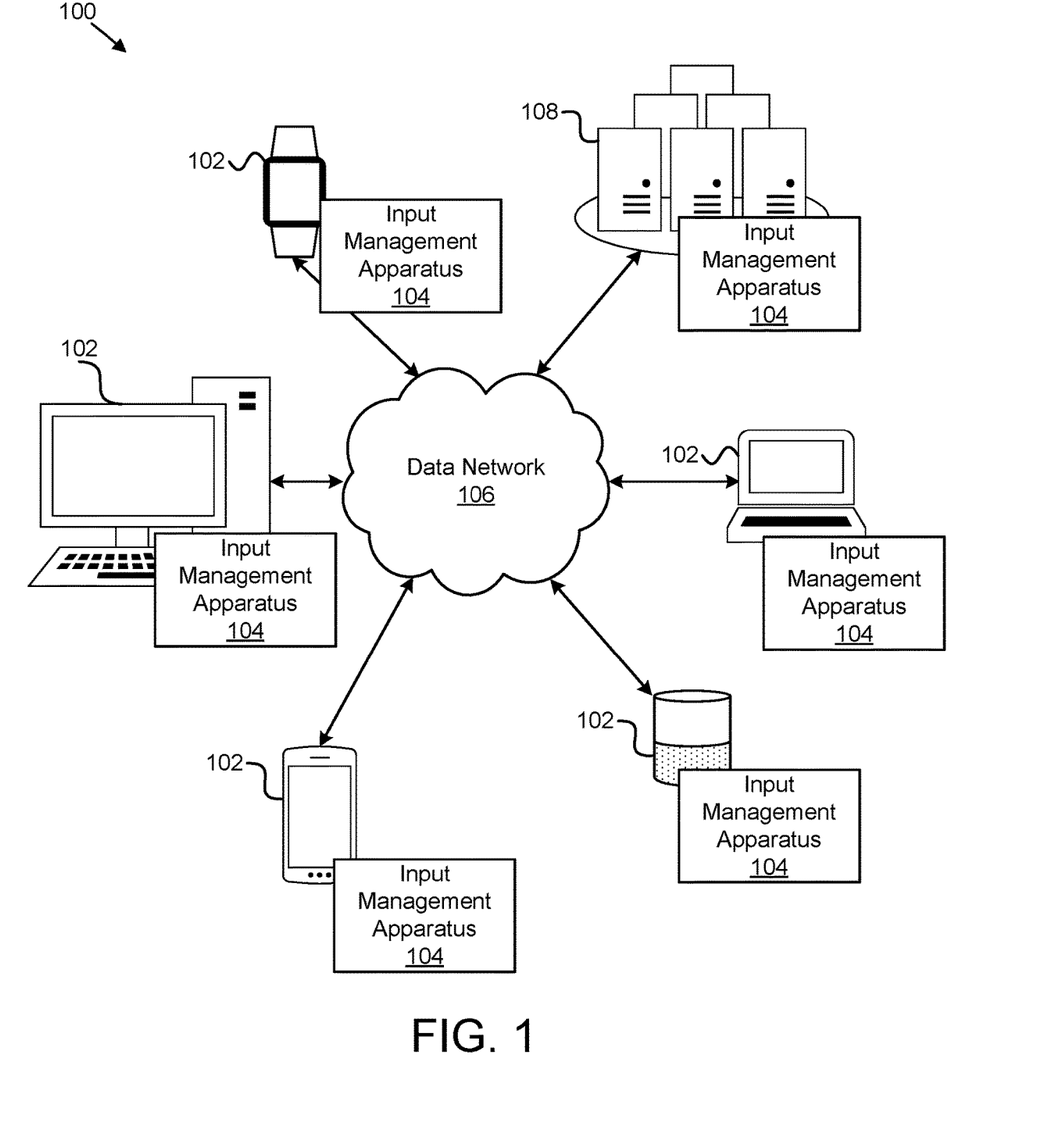
FIG. 1 is a schematic block diagram illustrating one embodiment of a system for dynamic input control positioning.

FIG. 1 is a schematic block diagram illustrating one embodiment of a system 100 for dynamic input control positioning. In one embodiment, the system 100 includes one or more information handling devices 102, one or more input management apparatuses 104, one or more data networks 106, and one or more servers 108. In certain embodiments, even though a specific number of information handling devices 102, input management apparatuses 104, data networks 106, and servers 108 are depicted in FIG. 1, one of skill in the art will recognize, in light of this disclosure, that any number of information handling devices 102, input management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include a touch-sensitive display that is configured to detect, sense, determine, and/or the like touch input from a user's finger, a stylus, and/or the like. In certain embodiments, the touch-sensitive display may include pressure or force sensors for detecting an amount of force or pressure applied at a contact location. The information handling devices 102 may include other sensors for sensing environmental information associated with the user's location/context such as location sensors, cameras, microphones, accelerometers, gyroscopes, proximity sensors, and/or the like.

In one embodiment, the input management apparatus 104 is configured to dynamically determine locations on a touch-screen display for placing virtual input elements such as buttons, sliders, and/or the like in such a way that the user is not required to look at the display, but can determine the location of the input elements in response to touching the display. For instance, the input management apparatus 104, in one embodiment, determines an application that is requesting touch input from a user (e.g., a phone application that presents two virtual buttons for answering or declining an incoming phone call; detects one or more contact locations of a touch input on the touch-sensitive display (e.g., in response to a user placing two fingers on the display), and dynamically positions one or more interface controls for providing touch input to the application at the one or more contact locations detected on the touch-screen display (e.g., positioning the answer button under one finger and the decline button under the other finger). The input management apparatus 104, including its various sub-modules, may be located on one or more information handling devices 102 in the system 100, one or more servers 108, one or more network devices, and/or the like. The input management apparatus 104 is described in more detail below with reference to FIGS. 2 and 3.

In one embodiment, the input management apparatus 104 improves upon conventional methods of providing touch input in that the user is not required to look at the display in order to locate the input controls. Conventionally, when a user is prompted for touch input, such as when a phone call is received on a smart phone, the user needs to look at the smart phone display to locate the touch inputs to accept or decline the call, which is distracting and could potentially be dangerous. The claimed solution, on the other hand, dynamically positions the input controls, e.g., a virtual button of slider, based on where the user touches the display so that the user does not have to look at the display when responding. As described in more detail below, the input management apparatus, in various embodiments, provides feedback to let the user know when the controls are positioned where the user is touching the display, and then the user can respond with a touch gesture, e.g., a tap, a swipe, a push, or the like to respond without ever having to look at the display, which increases the usability of the device and the safety of using the device while performing a different attention-intensive action such as driving.

In various embodiments, the input management apparatus 104 may be embodied as a hardware appliance that can be installed or deployed on an information handling device 102, on a server 108, or elsewhere on the data network 106. In certain embodiments, the input management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the input management apparatus 104 may include a power interface, a wired and/or wireless network interface, a graphical interface that attaches to a display, and/or a semiconductor integrated circuit device as described below, configured to perform the functions described herein with regard to the input management apparatus 104.

The input management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the input management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the input management apparatus 104.

The semiconductor integrated circuit device or other hardware appliance of the input management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the input management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
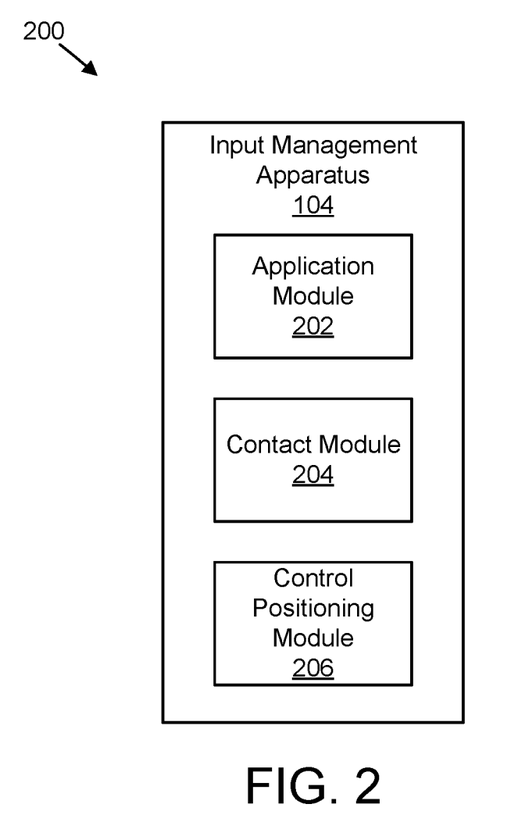
FIG. 2 is a schematic block diagram illustrating one embodiment of an apparatus for dynamic input control positioning.

FIG. 2 is a schematic block diagram illustrating one embodiment of an apparatus 200 for dynamic input control positioning. In one embodiment, the apparatus 200 includes an embodiment of an input management apparatus 104. The input management apparatus 104, in some embodiments, includes one or more of an application module 202, a contact module 204, and a control positioning module 206, which are described in more detail below.

In one embodiment, the application module 202 is configured to determine an application that is requesting touch input from a user. Examples of applications may include a phone application on a smart phone that requests or prompts for user input to accept or decline an incoming phone call; a music application where a user can pause, play or skip to the next or previous song; an application requesting a yes/no response; and/or the like.

In response to the application module 202 determining the application that is requesting touch input from the user, the contact module 204, in one embodiment, is configured to detect one or more contact locations of a touch input on a touch-sensitive display. The touch input may comprise one or more fingers, stylus, and/or the like. The contact module 204 may detect the contact locations using the sensors of the touch-sensitive display. For instance, the touch-sensitive display may comprise a resistive touchscreen, a capacitive touchscreen, a surface acoustic wave touchscreen, an infrared touchscreen, an optical imaging touchscreen, an acoustic pulse recognition touchscreen, or the like.

In response to detecting the touch input on the touch screen, the contact module 204 may determine the contact locations of the touch input. For example, the contact module 204 may determine coordinates of the contact locations on the touch screen. The coordinates may be absolute coordinates, relative coordinates (e.g., relative to a reference point such as a particular area or section of the display), and/or the like.

In one embodiment, the control positioning module 206 is configured to dynamically position one or more interface controls for providing touch input to the application at the one or more contact locations detected on the touch-sensitive display. For instance, if an phone application typically presents two buttons—one for accept and one for decline—when an incoming phone call is received, one button may be centered at a first contact location (e.g., a contact location of a pointer finger) and the other button may be centered at a second contact location (e.g., a contact location of a ring finger). Thus, the control positioning module 206 may use the screen coordinates that the contact module 204 determines for positioning the one or more interface controls on the display. The interface controls may include buttons, slider controls, and/or the like, which can be interacted with using a single touch input on the touch-sensitive display.

In one embodiment, the control positioning module 206 may position the interface controls at the contact locations, but in predefined regions of the display. For instance, if the interface controls comprise two buttons (e.g., for binary responses such as yes/no, accept/decline, and/or the like), the first button may be placed within the left half of the display, and the second button may be placed within the second half of the display so that the user can differentiate between the interface controls. If there is a single interface control, such as a slider interface control for answering a phone call, the control positioning module 206 may place it at a single contact location (e.g., the first contact location detected on the touch-sensitive display) so that the user can make a swipe gesture in any direction and have it be recognized as slider input.

In this manner, by dynamically positioning the interface controls where the user contacts the touch-sensitive display, the user can provide touch input to an application request or prompt without requiring the user to look at the display and/or without the display being activated for displaying information (e.g., graphical information such as virtual input controls), which reduces the chances of the user being distracted, especially while performing an activity that requires the user's full attention such as driving, exercising, and/or the like.

Figure 3:
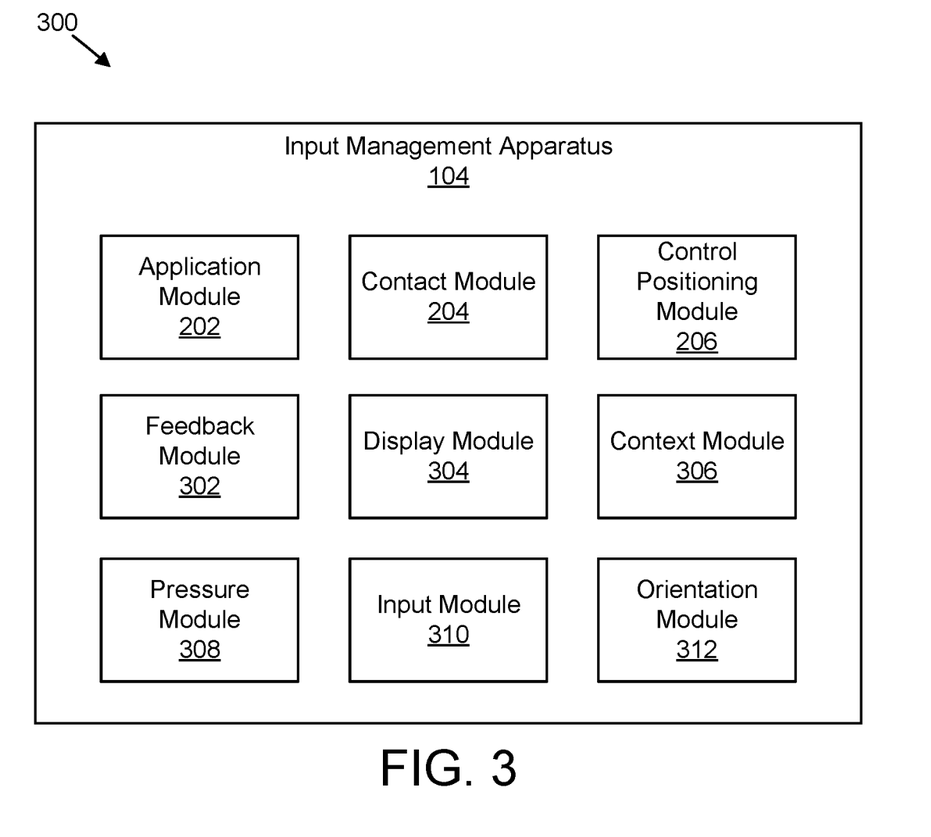
FIG. 3 is a schematic block diagram illustrating one embodiment of another apparatus for dynamic input control positioning.

FIG. 3 is a schematic block diagram illustrating one embodiment of an apparatus 300 for dynamic input control positioning. In one embodiment, the apparatus 300 includes an embodiment of an input management apparatus 104. The input management apparatus 104, in some embodiments, includes one or more of an application module 202, a contact module 204, and a control presenting module 206, which may be substantially similar to the application module 202, the contact module 204, and the control presenting module 206 described above with reference to FIG. 2. In further embodiments, the input management apparatus 104 includes one or more of a feedback module 302, a display module 304, a context module 306, a pressure module 308, an input module 310, and an orientation module 312, which are described in more detail below.

In one embodiment, the feedback module 302 is configured to provide feedback to the user in response to the one or more interface controls being positioned at the one or more contact locations where the user's fingers or stylus are contacting the touch-sensitive display. In this manner, the feedback module 302 signals to the user when the interface controls are in position and ready to interact with.

For instance, in one embodiment, the feedback module 302 may provide haptic feedback to the user such as force feedback, vibrations, and/or other motion. For example, the feedback module 302 may trigger the vibration motor, gyroscope, or the like of a smart phone when the interface icons are positioned at the contact locations to let the user know that the interface controls are ready to interact with. Other feedback may include audio feedback such as a beep or other sound, a combination of a vibration and a sound, and/or the like.

In one embodiment, the display module 304 is configured to maintain the touch-sensitive display in an input-only mode such that the touch-sensitive display receives touch input without presenting graphical elements on the display. For instance, the display module 304 may disable, inactivate, turn off, and/or the like the graphical portion of the display so that no graphical elements, e.g., virtual input controls are presented on the display. However, the touch-sensitive display may still detect and receive touch inputs. In this manner, the display can remain blank so that it does not distract the user, while being in an input-only mode so that touch inputs can still be detected.

In one embodiment, the context module 306 is configured to determine the user's context in response to the application requesting touch input from the user. For instance, the context module 306 may use input from one or more sensors to determine environmental information associated with the user to determine whether the user is in a state where he can be interrupted or not. The sensors may include location sensors, cameras, microphones, accelerometers, gyroscopes, proximity sensors, and/or the like. For example, the context module 306 may use accelerometer data and/or location data to determine that the user is driving, and is therefore in an uninterruptible state because the user needs full attention to drive safely. However, if the sensor data indicates that the user is sitting on the couch watching television (e.g., based on biometric data such as the user's heartrate, breathing rate, etc.; the location of the device; external sounds from the television; and/or the like), for example, then the context module 306 may determine that the user is in an interruptible state.

The one or more interface controls may be dynamically positioned in response to the context module 306 determining that the user is in an uninterruptible state. Because the user is performing an activity that the context module 306 determines requires the user's full attention, when an application requests touch input from the user, the display module 304 does not activate the graphical presentation portion of the graphical display, the contact module 204 detects one or more contact locations in response to the user touching the touch-sensitive display with an input object, and the control positioning module 206 positions interface controls at the determined contact locations so that the user's attention is not drawn away from the current activity while still allowing the user to provide a response to the application's request.

In further embodiments, the display module 304 determines whether to disable, inactivate, turn off, or blank the display based on whether the context module 306 determines that the user is in an interruptible state or an uninterruptible state. If the context module 306 determines that the user is in an uninterruptible state, then the display module 304 may place the display in an input-only mode so that the display is not enabled to present graphical elements, but continues to receive touch inputs.

In one embodiment, the pressure module 308 is configured to detect a first pressure of the touch input on the touch-sensitive display. As described above, the touch-sensitive display may include pressure or force sensors that are configured to detect an amount of force or pressure that is applied to the touch-sensitive display at a contact location. In one embodiment, the first pressure that the pressure module 308 detects triggers positioning of the one or more interface controls on the touch-sensitive display. For instance, the pressure module 308 may detect whether the amount of pressure applied to the touch-sensitive display at a contact location satisfies (e.g., is greater than or equal to) a first threshold pressure, e.g., a threshold contact pressure, and, if so, the pressure module 308 may signal or trigger positioning interface elements at the contact location.

In further embodiments, the pressure module 308 detects a second pressure of a touch input. The second pressure, in some embodiments, is part of or is a continuation of the same touch input of the first contact pressure (e.g., the user has not picked up his finger off of the display), and may be greater than or equal to the first pressure. In such an embodiment, the second pressure may indicate a selection of at least one of the one or more interface controls. For instance, the pressure module 308 may determine whether the amount of the second pressure satisfies (e.g., is greater than or equal to) a second pressure threshold, e.g., a threshold contact pressure, and, if so, the pressure module 308 may signal or trigger selection of an interface control that has been positioned at the location of the touch input that generated the second pressure.

For example, if a phone application receives an incoming phone call, the context module 306 may determine that the user is in an uninterruptible state because the user is driving (e.g., determined based on accelerometer data, location data, etc.). Accordingly, the display module 304 may not activate the graphical portion of the touch-sensitive display; however, the user may place two fingers on the touch-sensitive display, one for accepting the call using an accept interface control, and one for declining the call using a decline interface control. When the user places his fingers on the touch-sensitive display, the contact module 204 may determine the contact locations of the fingers on the touch-sensitive display.

The pressure module 308 may further detect a first amount of pressure applied by each finger to the touch-sensitive display (e.g., using a pressure/force sensor), and determine whether the first amount of pressure satisfies a first pressure threshold. If so, then the control positioning module 206 may position the accept and decline virtual interface control buttons at the determined contact locations, one under each finger. The feedback module 302 may then provide haptic or audio feedback to the user to indicate that the control positioning module 206 has positioned the interface controls at the contact locations. The pressure module 308 may then detect a second amount of pressure from the user's fingers to determine which of the interface controls the user would like to select. For instance, if the user presses harder with the finger above the accept interface control, the pressure module 308 may determine that the amount of pressure being applied satisfies a second pressure threshold, and may trigger selection of the accept interface control, which signals the phone application to accept the incoming phone call.

In one embodiment, the input module 310 is configured to receive user input in response to the user interacting with at least one of the one or more interface controls using an input gesture. The input module 310, for instance, may receive, detect, determine, and/or the like selection of an interface control, and may signal, trigger, and/or pass the selection of the interface control to the application that is requesting the user input. Continuing with the example above, the input module 310 may determine that the user is selecting the accept interface control to answer the telephone call, e.g., in response to a signal from the pressure module 308, and may signal or trigger the phone application to accept the incoming phone call.

In certain embodiments, the detected input gesture may include a swipe gesture, a tap gesture, a force gesture (as explained above with reference to the pressure module 308), and/or the like. A swipe gesture may be used to interact with a slider interface control, such as a slide to open/unlock or slide to answer control. A tap gesture, in certain embodiments, comprises an initial touch gesture, e.g., with the user's finger, lifting the user's finger for a period of time (e.g., a second or less), and then touching the display again. Thus, for a tap gesture, when the contact module 204 detects the initial touch input, the control positioning module 206 may position an interface control such as a button at the contact location of the initial touch input, and then the user can select the interface control by lifting their finger and touching substantially the same area again within a predefined period of time.

In one embodiment, the orientation module 312 is configured to determine an orientation of the touch-sensitive display. In such an embodiment, the orientation module 310 orients the one or more interface controls to correspond to the orientation of the touch-sensitive display. For instance, if the interface control is a slider control, the orientation module 312 may determine whether a smartphone is oriented in a horizontal or vertical position, based on accelerometer data, so that the control positioning module 206 can position the slider control in the corresponding position, e.g., vertical or horizontal.

Figure 4:
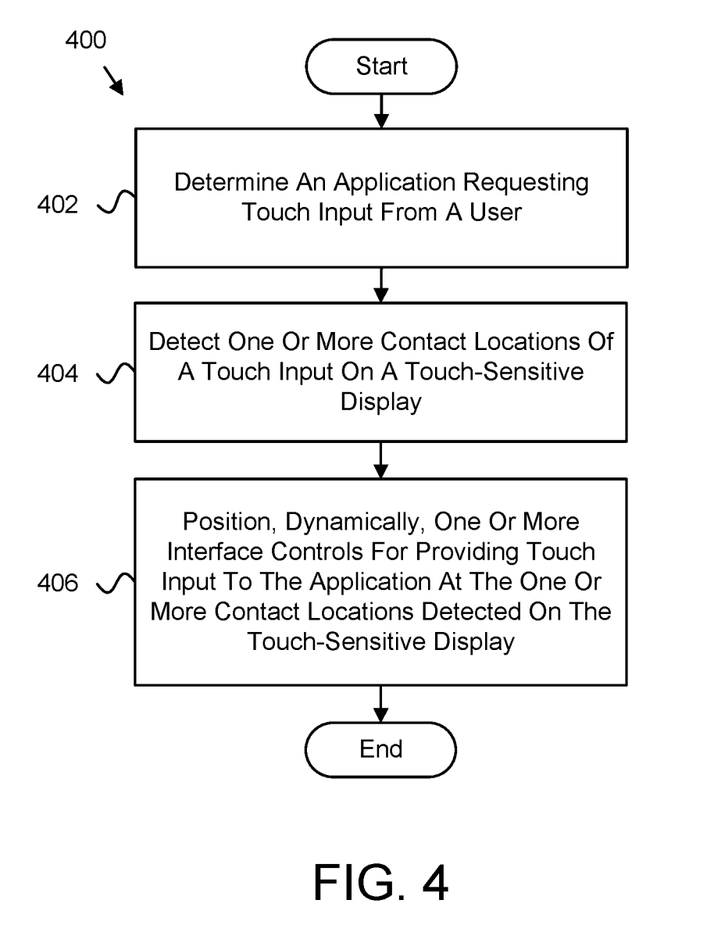
FIG. 4 is a schematic flow chart diagram illustrating one embodiment of a method for dynamic input control positioning.

FIG. 4 is a schematic flow chart diagram illustrating one embodiment of a method 400 for dynamic input control positioning. In one embodiment, the method 400 begins and the application module 202 determines 402 an application requesting touch input from a user. In certain embodiments, the contact module 204 detects 404 one or more contact locations of a touch input on a touch-sensitive display. In further embodiments, the control positioning module 206 dynamically positions 406 one or more interface controls for providing touch input to the application at the one or more contact locations detected on the touch-sensitive display, and the method 400 ends.

Figure 5:
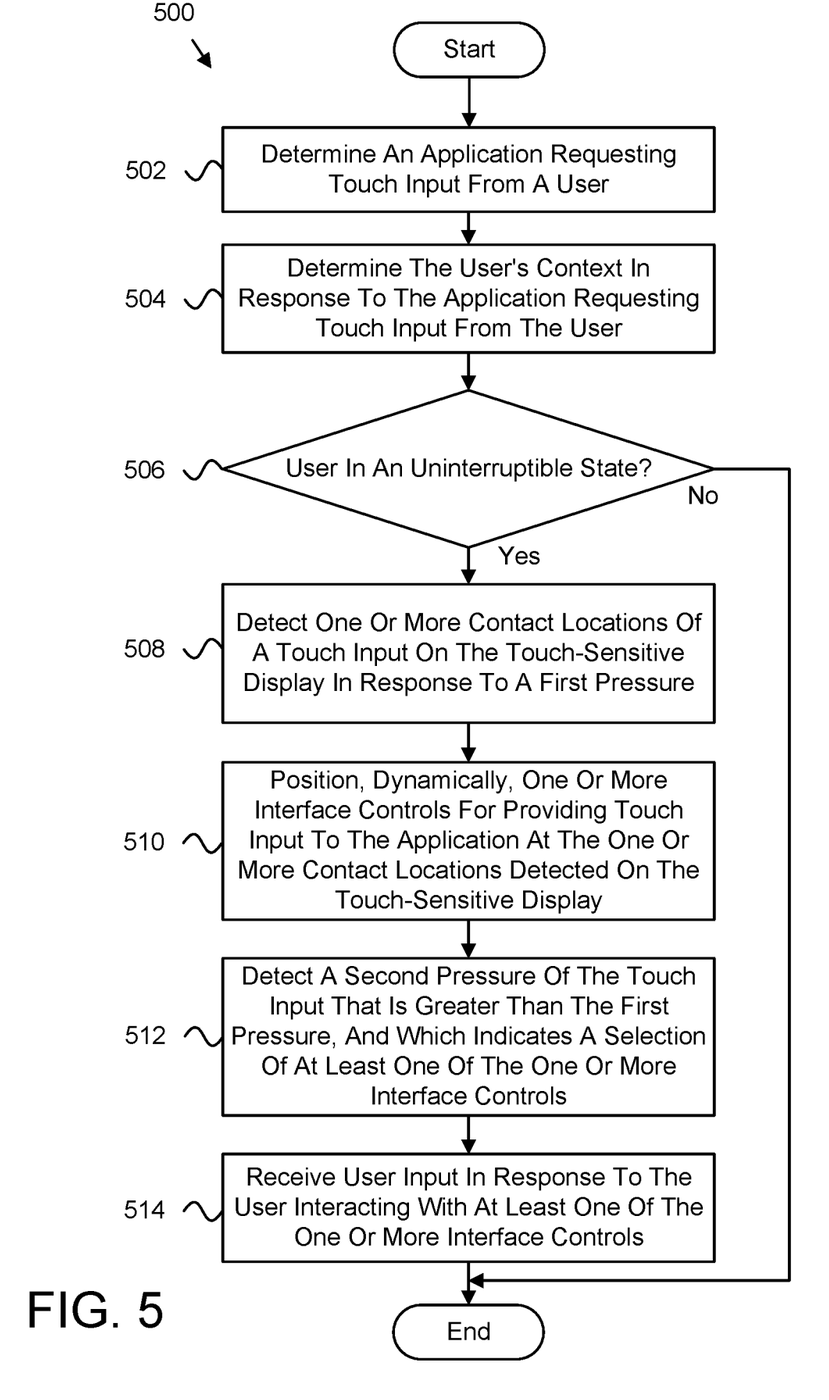
FIG. 5 is a schematic flow chart diagram illustrating one embodiment of another method for dynamic input control positioning.

FIG. 5 is a schematic flow chart diagram illustrating one embodiment of another method 500 for dynamic input control positioning. In one embodiment, the method 500 begins and the application module 202 determines 502 an application requesting touch input from a user. In certain embodiments, the context module 306 determines 504 the user's context in response to the application requesting touch input from the user. The context module 306, in further embodiments, determines 506 whether the user's context indicates that the user is in an uninterruptible state. If so, then the method 500 ends.

Otherwise, the contact module 204, in one embodiment, detects 508 one or more contact locations of a touch input on a touch-sensitive display in response to the pressure module 308 detecting a first amount of pressure applied to the touch-sensitive display satisfies a first pressure threshold. In further embodiments, the control positioning module 206 dynamically positions 510 one or more interface controls for providing touch input to the application at the one or more contact locations detected on the touch-sensitive display. In some embodiments, the pressure module 308 detects 512 a second amount of pressure of the touch input that is greater than the first amount of pressure and satisfies a second pressure threshold, which indicates a selection of at least one of the one or more interface controls. In various embodiments, the input module 310 receives 514 user input in response to the user interacting with the at least one interface control, e.g., by providing additional pressure to select the interface control, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
a touch-sensitive display;
a processor; and
a memory that stores code executable by the processor to:
determine an application requesting touch input from a user, the application positioning one or more interface controls for receiving touch input for the application at a default location on a touch-sensitive display;
detect one or more contact locations of a touch input on the touch-sensitive display while the application is requesting the touch input from the user;
detect a first pressure of the touch input at the one or more contact locations of the touch input on the touch-sensitive display, the contact location different from the default location of an interface control;
in response to the first pressure of the touch input exceeding a predetermined threshold pressure:
dynamically move, without user input, from the default location on the touch-sensitive display, to the detected one or more contact locations on the touch-sensitive display, the one or more interface controls for providing touch input to the application without graphically presenting the one or more interface controls on the touch-sensitive display;

provide feedback in response to the one or more interface controls being positioned at the one or more detected contact locations for receiving input; and receive input from the user for the application via the one or more interface controls.

2. The apparatus of claim 1, wherein the feedback comprises haptic feedback selected from the group consisting of forces, vibrations, and motions.

3. The apparatus of claim 1, wherein the feedback comprises audio feedback provided through a speaker.

4. The apparatus of claim 1, wherein the code is further executable by the processor to maintain the touch-sensitive display in an input only mode such that the touch-sensitive display receives touch input without presenting graphical elements on the display.

5. The apparatus of claim 1, wherein the code is further executable by the processor to determine the user's context in response to the application requesting touch input from the user, the user's context indicating whether the user is in an uninterruptible state, the one or more interface controls dynamically positioned in response to the user being in the uninterruptible state.

6. The apparatus of claim 5, wherein the user's context is determined using one or more sensors operably coupled to the processor, the one or more sensors sensing data describing the user's context.

7. The apparatus of claim 1, wherein the code is further executable by the processor to detect a second pressure of the touch input, the second pressure greater than the first pressure, the second pressure indicating a selection of at least one of the one or more interface controls.

8. The apparatus of claim 1, wherein the code is further executable by the processor to receive user input in response to the user interacting with at least one of the one or more interface controls.

9. The apparatus of claim 8, wherein the user input is selected from the group consisting of a swipe gesture, a tap gesture, and a force gesture in response to the one or more interface controls dynamically positioned at the one or more contact locations.

10. The apparatus of claim 1, wherein the one or more interface controls comprise interface controls that are selectable by performing a single touch input on the touch-sensitive display.

11. The apparatus of claim 1, wherein the executable code is further executable by the processor to determine an orientation of the touch-sensitive display and orient the one or more interface controls to correspond to the orientation of the touch-sensitive display.

12. A method comprising:
determining, by a processor, an application requesting touch input from a user, the application positioning one or more interface controls for receiving touch input for the application at a default location on a touch-sensitive display;

detecting one or more contact locations of a touch input on the touch-sensitive display while the application is requesting the touch input from the user;

detecting a first pressure of the touch input at the one or more contact locations of the touch input on the touch-sensitive display, the contact location different from the default location of an interface control;

in response to the first pressure of the touch input exceeding a predetermined threshold pressure:
dynamically moving, without user input, from the default location on the touch-sensitive display, to the detected one or more contact locations on the touch-sensitive display, the one or more interface controls for providing touch input to the application without graphically presenting the one or more interface controls on the touch-sensitive display;

providing feedback in response to the one or more interface controls being positioned at the one or more detected contact locations for receiving input; and receiving input from the user for the application via the one or more interface controls.

13. The method of claim 12, wherein the feedback is selected from the group consisting of haptic feedback and audio feedback.

14. The method of claim 12, further comprising maintaining the touch-sensitive display in an input only mode such that the touch-sensitive display receives touch input without presenting graphical elements on the display.

15. The method of claim 12, further comprising determining the user's context in response to the application requesting touch input from the user, the user's context indicating whether the user is in an uninterruptible state, the one or more interface controls dynamically positioned in response to the user being in the uninterruptible state.

16. The method of claim 12, further comprising detecting a second pressure of the touch input, the second pressure greater than the first pressure, the second pressure indicating a selection of at least one of the one or more interface controls.

17. The method of claim 12, further comprising determining an orientation of the touch-sensitive display and orienting the one or more interface controls to correspond to the orientation of the touch-sensitive display.

18. A program product comprising a non-transitory computer readable storage medium that stores code executable by a processor, the executable code comprising code to perform:
determining an application requesting touch input from a user, the application positioning one or more interface controls for receiving touch input for the application at a default location on a touch-sensitive display;

detecting one or more contact locations of a touch input on the touch-sensitive display while the application is requesting the touch input from the user;

detecting a first pressure of the touch input at the one or more contact locations of the touch input on the touch-sensitive display, the contact location different from the default location of an interface control;

in response to the first pressure of the touch input exceeding a predetermined threshold pressure:
dynamically moving, without user input, from the default location on the touch-sensitive display, to the detected one or more contact locations on the touch-sensitive display, the one or more interface controls for providing touch input to the application without graphically presenting the one or more interface controls on the touch-sensitive display;

providing feedback in response to the one or more interface controls being positioned at the one or more detected contact locations for receiving input; and receiving input from the user for the application via the one or more interface controls.

* * * * *